US009350041B2

(12) United States Patent
Chen et al.

(10) Patent No.: US 9,350,041 B2
(45) Date of Patent: May 24, 2016

(54) DOUBLE-FOLDING DEVICE FOR SOFTLY-PACKAGED LITHIUM ION BATTERIES

(71) Applicant: Dongguan Amperex Technology Limited, Dongguan, Guangdong (CN)

(72) Inventors: Shaoyu Chen, Guangdong (CN); Conghui You, Guangdong (CN); Dong Duan, Guangdong (CN); Chunjiang Xiang, Guangdong (CN); Jianqun Xiong, Guangdong (CN); Hongxin Fang, Guangdong (JP)

(73) Assignee: DONGGUAN AMPEREX TECHNOLOGY LIMITED, Dongguan, Guangdong (CN)

( * ) Notice: Subject to any disclaimer, the term of this patent is extended or adjusted under 35 U.S.C. 154(b) by 0 days.

(21) Appl. No.: 14/716,953

(22) Filed: May 20, 2015

(65) Prior Publication Data
US 2015/0340725 A1 Nov. 26, 2015

(30) Foreign Application Priority Data
May 21, 2014 (CN) .......................... 2014 1 0215164

(51) Int. Cl.
*H01M 10/04* (2006.01)
*H01M 10/0525* (2010.01)
*H01M 10/058* (2010.01)
*H01M 10/0583* (2010.01)
*H01M 2/02* (2006.01)

(52) U.S. Cl.
CPC ............ *H01M 10/0404* (2013.01); *H01M 2/02* (2013.01); *H01M 10/058* (2013.01); *H01M 10/0525* (2013.01); *H01M 10/0583* (2013.01); *Y10T 29/53135* (2015.01)

(58) Field of Classification Search
USPC ..................................................... 29/730, 731
See application file for complete search history.

(56) References Cited

U.S. PATENT DOCUMENTS

| 7,055,570 B2 * | 6/2006 | Hong ................. | H01M 10/0404 156/552 |
| 7,500,304 B2 * | 3/2009 | Hong ................. | H01M 10/0404 156/552 |
| 2006/0014075 A1 * | 1/2006 | Lambert ............. | H01M 2/1606 429/144 |
| 2010/0003594 A1 * | 1/2010 | Hong .................... | H01M 2/021 429/163 |
| 2013/0133184 A1 * | 5/2013 | Bacci ................ | H01M 10/0404 29/623.1 |

FOREIGN PATENT DOCUMENTS

JP 2001110375 A * 4/2001

* cited by examiner

*Primary Examiner* — Gregg Cantelmo
(74) *Attorney, Agent, or Firm* — Jackson IPG PLLC; Demian K. Jackson

(57) ABSTRACT

The present invention belongs to the technical field of lithium ion battery production equipment, and particularly relates to a double-folding device for softly-packaged lithium ion batteries, comprising a rack, and a loaded-material positioning mechanism, a primary folding mechanism and a secondary folding mechanism which are arranged on the rack in turn. A bonding layer arrangement mechanism is further provided between the primary folding mechanism and the secondary folding mechanism. In comparison to the prior art, in the present invention, by providing, between the primary folding mechanism and the secondary folding mechanism, a bonding layer arrangement mechanism which is configured as a mechanism capable of online monitoring the arrangement of a bonding layer and automatically adjusting the glue dispensing position and glue volume, the real-time adjustment of the dispensing position and volume of glue is realized.

10 Claims, 4 Drawing Sheets

DOUBLE-FOLDING DEVICE FOR SOFTLY-PACKAGED LITHIUM ION BATTERIES

FIELD OF THE INVENTION

The present invention belongs to the technical field of lithium ion battery production equipment, and particularly relates to a double-folding device for softly-packaged lithium ion batteries.

BACKGROUND OF THE INVENTION

In the increasingly competitive market, higher and higher requirements on the energy density of softly-packaged lithium ion batteries have been proposed by various electronic products. To enhance the market competitiveness, it is desirable for manufacturers to reduce the production cost of softly-packaged lithium ion batteries as much as possible. To increase the energy density of batteries ad reduce the production cost simultaneously, a single-folding rubber coating procedure may be replaced with a double-folding rubber coating procedure.

However, the double-folding rubber coating procedure has a very high precision requirement on the arrangement of a station for the bonding layer. This station is required to have precise glue dispensing positions and strict glue volume control. The offset of a glue dispensing position will cause the risk of unfolding or glue overflow due to the insecure bonding between the secondarily folded edge and the battery cell body. Excessive glue volume will cause the risk of glue overflow, while inadequate glue volume will cause the risk of unfolding due to the insecure bonding between the secondarily folded edge and the battery cell body. During the automatic production, the slight deviation of glue dispensing positions and glue volume will result in a large batch of defective products. However, the desired precision cannot be achieved as both the glue dispensing position and glue volume of double-folding equipment in the current market are artificially monitored. As a result, the reject rate is increased. Furthermore, a large amount of manpower is consumed, and the production cost is increased.

SUMMARY OF THE INVENTION

An objective of the present invention is to, in view of the deficiencies of the prior art, provide a double-folding device for softly-packaged lithium ion batteries, which is able to online monitor the arrangement of a bonding layer and automatically adjust the glue dispensing position and glue volume.

To achieve the above objective, the present invention employs the following technical solutions: a double-folding device for softly-packaged lithium ion batteries is provided, including a rack, and a loaded-material positioning mechanism, a primary folding mechanism and a secondary folding mechanism which are arranged on the rack in turn, wherein a bonding layer arrangement mechanism is further provided between the primary folding mechanism and the secondary folding mechanism.

As an improvement of the double-folding device for softly-packaged lithium ion batteries provided by the present invention, the bonding layer arrangement mechanism is configured as a glue dropping mechanism including a bonding layer position closed-loop control system and a bonding layer material closed-loop control system.

As an improvement of the double-folding device for softly-packaged lithium ion batteries provided by the present invention, the bonding layer position closed-loop control system includes a position monitoring mechanism, a glue dropping position control mechanism and a position adjusting mechanism, the glue dropping position control mechanism being connected to the position monitoring mechanism and the position adjusting mechanism, respectively.

As an improvement of the double-folding device for softly-packaged lithium ion batteries provided by the present invention, the position monitoring mechanism is configured as a charge-coupled device image sensor; the glue dropping position control mechanism is configured as a programmable logic controller, a singlechip or a computer; and the position adjusting mechanism comprises a first object stage and a first servo motor, the first object stage being driven by the first servo motor, the first servo motor being connected to the glue dropping position control mechanism.

As an improvement of the double-folding device for softly-packaged lithium ion batteries provided by the present invention, the bonding layer material closed-loop control system includes a glue volume monitoring mechanism, a glue volume control mechanism and a glue volume adjusting mechanism, the glue volume control mechanism being connected to the glue volume monitoring mechanism and the glue volume adjusting mechanism, respectively.

As an improvement of the double-folding device for softly-packaged lithium ion batteries provided by the present invention, the glue volume monitoring mechanism is configured as a charge-coupled device image sensor; the glue volume control mechanism is configured as a programmable logic controller, a singlechip or a computer; and the glue volume adjusting mechanism includes an electrically-controlled pressure regulating valve, a glue tank, a glue dropper and a constant temperature system, the glue tank being in communication with the glue dropper via a pipeline, the constant temperature system being connected to the glue tank, the electrically-controlled pressure regulating valve being connected to the glue tank and the glue volume control mechanism, respectively.

As an improvement of the double-folding device for softly-packaged lithium ion batteries provided by the present invention, the bonding layer arrangement mechanism is configured as an adhesive tape sticking mechanism including an adhesive tape sticking position monitoring mechanism, an adhesive tape sticking position control mechanism, an adhesive tape sticking position adjusting mechanism, an adhesive tape unrolling device for releasing an adhesive tape, an adhesive tape attaching mechanism and an adhesive tape rolling device for winding the adhesive tape, the adhesive tape sticking position control mechanism being connected to the adhesive tape sticking position monitoring mechanism and the adhesive tape sticking position adjusting mechanism, respectively, one end of the adhesive tape being disposed on the adhesive tape unrolling device while the other end thereof being rolled on the adhesive tape rolling device after passing through the adhesive tape attaching mechanism.

As an improvement of the double-folding device for softly-packaged lithium ion batteries provided by the present invention, the adhesive tape sticking position monitoring mechanism is configured as a charge-coupled device image sensor; the adhesive tape sticking position control mechanism is configured as a programmable logic controller, a singlechip or a computer; and the adhesive tape sticking position adjusting mechanism includes a second object stage and a second servo motor, the second object stage being driven by the second servo motor, the second servo motor being connected to the adhesive tape sticking position control mechanism.

As an improvement of the double-folding device for softly-packaged lithium ion batteries provided by the present invention, the loaded-material positioning mechanism includes centering and positioning push plates, a clamping cylinder and a clamp, the centering and positioning push plates being disposed on left and right sides of the clamp, the clamping cylinder being provided above the clamp.

As an improvement of the double-folding device for softly-packaged lithium ion batteries provided by the present invention, the primary folding mechanism includes an edge cutter, a primary folding roller and a folded-edge shaping mechanism which are arranged in turn, the edge cutter being near the loaded-material positioning mechanism, the folded-edge shaping mechanism being arranged near the bonding layer arrangement mechanism; and, the secondary folding mechanism comprises a secondary folding roller, a hot-press shaping mechanism and a cold-press shaping mechanism which are arranged in turn, the secondary folding roller being arranged near the bonding layer arrangement mechanism.

In comparison to the prior art, in the present invention, by providing a bonding layer arrangement mechanism between the primary folding mechanism and the secondary folding mechanism, a bonding layer may be arranged on a primarily folded edge of a battery cell when the battery cell already subjected to a primary folding passes through the bonding layer arrangement mechanism, and the bonding layer can bond the primarily folded edge with the battery cell when the battery cell passes through the secondary folding mechanism again. The bonding layer arrangement mechanism in the present invention is configured as a mechanism capable of online monitoring the arrangement of a bonding layer and automatically adjusting the glue dispensing position and glue volume, the real-time adjustment of the dispensing position and volume of glue is realized. Accordingly, the precision of the glue dispensing position and glue volume is greatly improved, the reject rate is decreased, both the manpower and production cost are reduced, and the energy density of batteries is improved.

Figure 1:
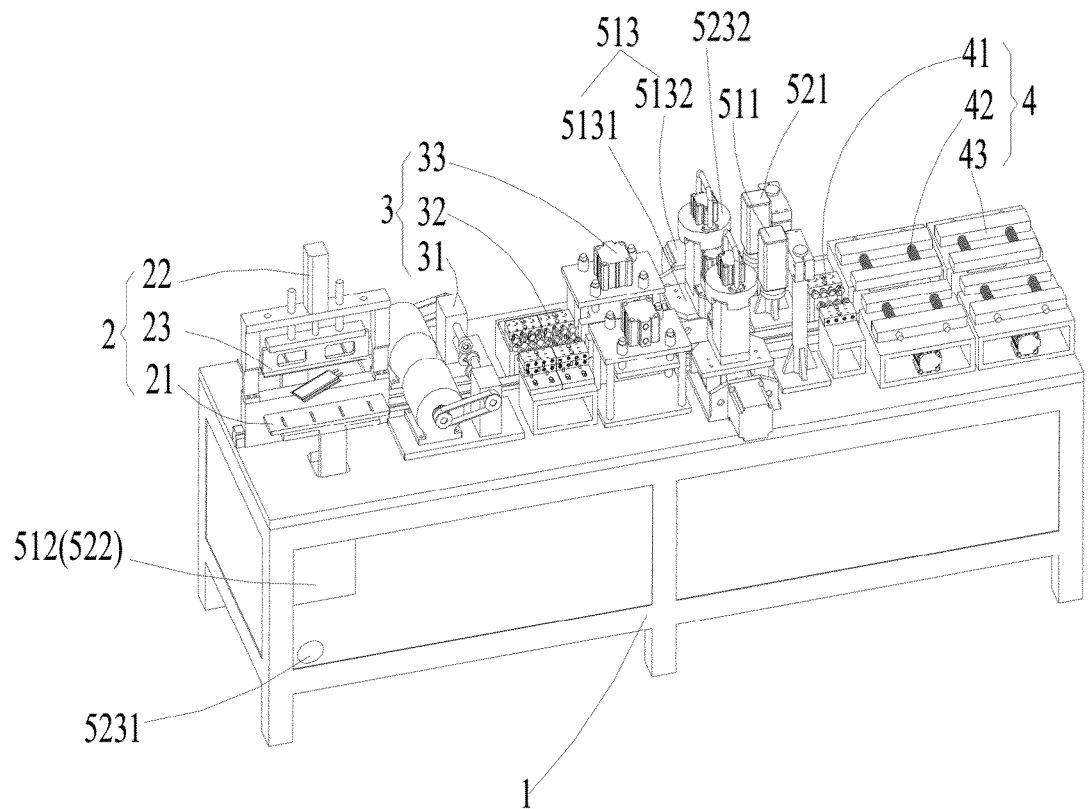
FIG. 1 is a stereoscopic view of Embodiment 1 of the present invention.

in the drawings: 1-Rack; 2-Loaded-material positioning mechanism; 21-Centering and positioning push plates; 22-Clamping cylinder; 23-Clamp; 3-Primary folding mechanism; 31-Edge cutter; 32-Primary folding roller; 33-Folded-edge shaping mechanism; 4-Secondary folding mechanism; 41-Secondary folding roller; 42-Hot-press shaping mechanism; 43-Cold-press shaping mechanism; 5-Bonding layer arrangement mechanism; 511-Position monitoring mechanism; 512-Glue dropping position control mechanism; 513-Position adjusting mechanism; 5131-First object stage; 5132-First servo motor; 521-Glue volume monitoring mechanism; 522-Glue volume control mechanism; 523-Glue volume adjusting mechanism; 5231-Electrically-controlled pressure regulating valve; 5232-Glue tank; 5233-Glue dropper; 53-Adhesive tape sticking position monitoring mechanism; 531-Second object stage; 532-Second servo motor; 54-Adhesive tape unrolling device; 55-Adhesive tape attaching mechanism; 56-Adhesive tape rolling device; 57-Adhesive tape; 6-Battery core body; 7-Primarily folded edge; and, 8-Bonding layer.

DETAILED DESCRIPTION OF THE PREFERRED EMBODIMENTS

The present invention will be described as below in more details with reference to the specific implementations and the accompanying drawings in the specification. However, the implementations of the present invention are not limited thereto.

Embodiment 1

As shown in FIGS. 1-9, this embodiment provides a double-folding device for softly-packaged lithium ion batteries, including a rack 1, and a loaded-material positioning mechanism 2, a primary folding mechanism 3 and a secondary folding mechanism 4 which are arranged on the rack 1 in turn. A bonding layer arrangement mechanism 5 is further provided between the primary folding mechanism 3 and the secondary folding mechanism 4. A battery cell is primarily folded by the primary folding mechanism 3 after loaded by the loaded-material positioning mechanism 2, and then passes through the bonding layer arrangement mechanism 5. The bonding layer arrangement mechanism 5 dispenses a bonding layer 8 on a primarily folded edge 7 of the battery cell. After the battery cell passes through the secondary folding mechanism 4, the bonding layer 8 bonds the primarily folded edge 7 with a battery cell body 6.

Figure 7:
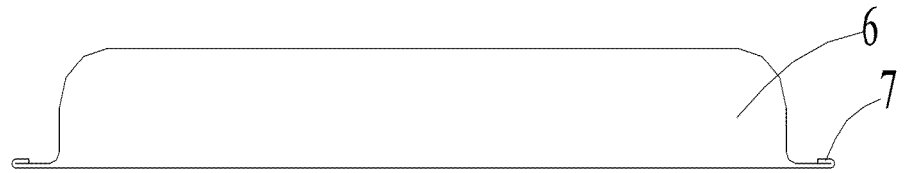
FIG. 7 is a structural diagram in a case where a battery is subjected to primary folding by a primary folding mechanism according to the present invention.
Figure 8:
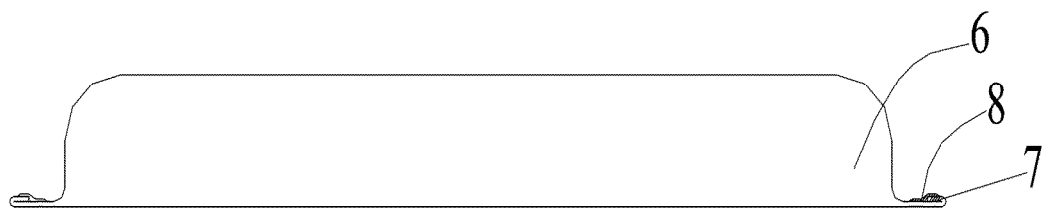
FIG. 8 is a structural diagram in a case where a bonding layer is arranged on a battery by a bonding layer arrangement mechanism according to the present invention.

The bonding layer arrangement mechanism 5 is configured as a glue dropping mechanism. When the battery cell already subjected to a primary folding (as shown in FIG. 7) passes through this mechanism, the mechanism dispenses a free-flowing bonding layer 8 on the primarily folded edge 7 of the battery cell (as shown in FIG. 8).

The glue dropping mechanism includes a bonding layer position closed-loop control system and a bonding layer material closed-loop control system. These two systems are cooperated with each other when in use to ensure that the bonding layer arrangement position and the bonding layer glue volume meet the requirements.

The bonding layer position closed-loop control system includes a position monitoring mechanism 511, a glue dropping position control mechanism 512 and a position adjusting mechanism 513. The glue dropping position control mechanism 512 is connected to the position monitoring mechanism 511 and the position adjusting mechanism 513, respectively. When in use, the position monitoring mechanism 511 first monitors the glue dispensing position and then feeds the glue dispensing position back to the glue dropping position control mechanism 512. Then, the glue dropping position control mechanism 512 compares a feedback signal with a preset signal; and sends, if there is an offset, an instruction to control the position adjusting mechanism 513 to adjust the glue dispensing position, thereby enabling the glue dispensing position to meet the requirements.

The position monitoring mechanism 511 is configured as a charge-coupled device image sensor; the glue dropping position control mechanism 512 is configured as a programmable logic controller, a singlechip or a computer; and the position adjusting mechanism 513 includes a first object stage 5131 and a first servo motor 5132. The first object stage 5131 is driven by the first servo motor 5132, and the first servo motor 5132 is connected to the glue dropping position control mechanism 512.

The bonding layer material closed-loop control system includes a glue volume monitoring mechanism 521, a glue volume control mechanism 522 and a glue volume adjusting mechanism 523. The glue volume control mechanism 522 is connected to the glue volume monitoring mechanism 521 and the glue volume adjusting mechanism 523, respectively. When in use, the glue volume monitoring mechanism 521 first monitors the glue volume and then feeds the glue volume back to the glue volume control mechanism 522. Then, the glue volume control mechanism 522 compares a feedback signal with a preset signal; and sends, if there is an offset, an instruction to the glue volume adjusting mechanism 523 to adjust the glue volume, thereby enabling the glue volume to meet the requirements. The structure of the glue volume monitoring mechanism 521 is the same as that of the position monitoring mechanism 511.

The glue volume monitoring mechanism 521 is configured as a charge-coupled device image sensor; the glue volume control mechanism 522 is configured as a programmable logic controller, a singlechip or a computer; and the glue volume adjusting mechanism 523 includes an electrically-controlled pressure regulating valve 5231, a glue tank 5232, a glue dropper 5233 and a constant temperature system. The glue tank 5232 is in communication with the glue dropper 5233 via a pipeline 5234. The constant temperature system is connected to the glue tank 5232. The electrically-controlled pressure regulating valve 5231 is connected to the glue tank 5232 and the glue volume control mechanism 522, respectively. Specifically, the constant temperature system may be a constant temperature material layer sheathed outside the glue tank 5232.

Figure 4:
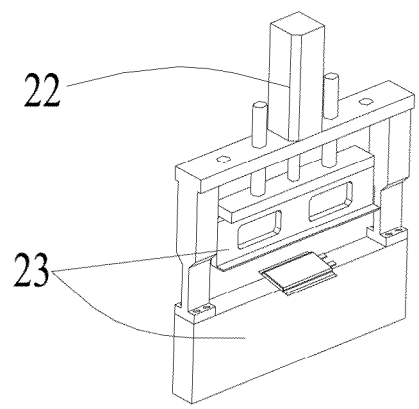
FIG. 4 is a schematic diagram of a loaded-material positioning mechanism according to the present invention (the centering and positioning push plates are not shown)
Figure 5:
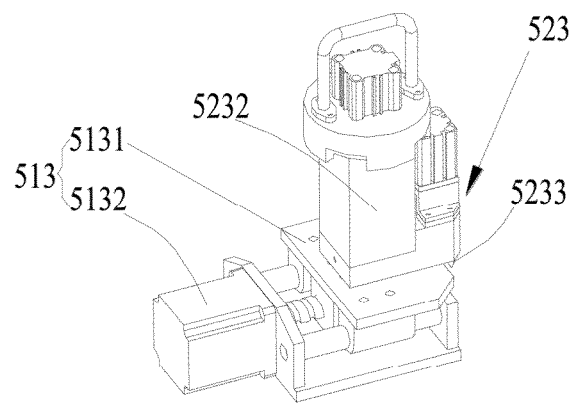
FIG. 5 is a partially structural diagram of a glue dropping mechanism according to Embodiment 1 of the present invention.
Figure 6:
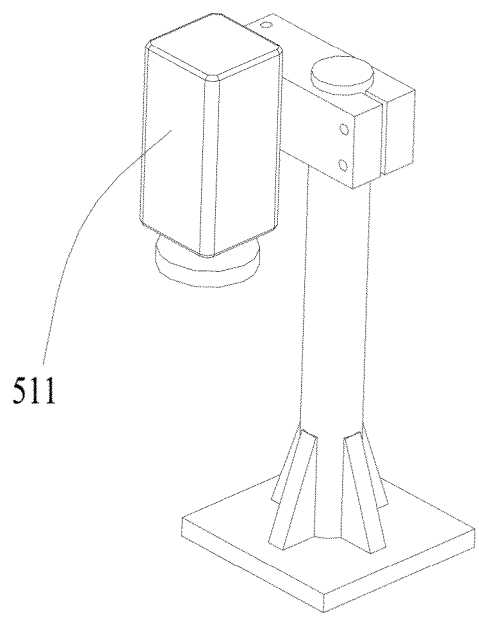
FIG. 6 is a schematic diagram of a position monitoring mechanism according to the present invention.

As shown in FIG. 4, the loaded-material positioning mechanism 2 includes centering and positioning push plates 21, a clamping cylinder 22 and a clamp 23. The centering and positioning push plates 21 are disposed on left and right sides of the clamp 23, and the clamping cylinder 22 is provided above the clamp 23.

Figure 2:
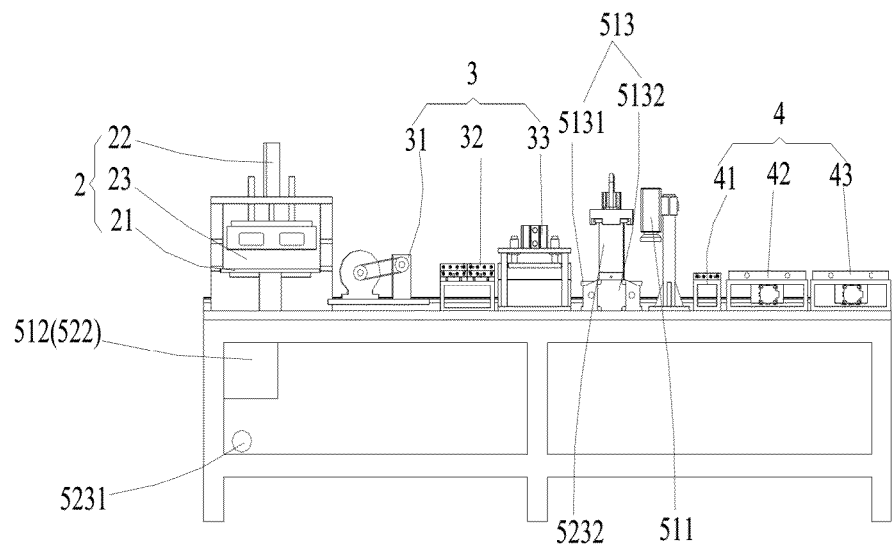
FIG. 2 is a front view of Embodiment 1 of the present invention.
Figure 3:
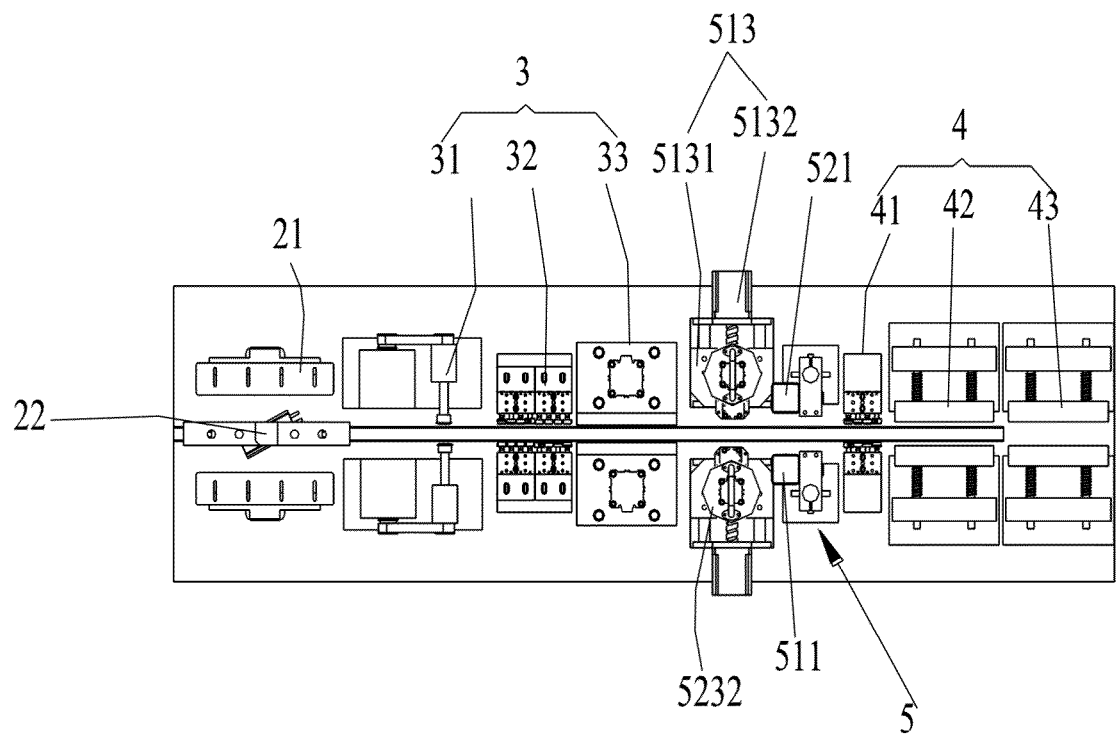
FIG. 3 is a top view of Embodiment 1 of the present invention.

As shown in FIGS. 1-3, the primary folding mechanism 3 includes an edge cutter 31, a primary folding roller 32 and a folded-edge shaping mechanism 33 which are arranged in turn. The edge cutter 31 is near the loaded-material positioning mechanism 2, and the folded-edge shaping mechanism 33 is arranged near the bonding layer arrangement mechanism 5.

When passing through the primary folding mechanism 3, a well positioned battery cell is finely cut by the edge cutter 31, subjected to a primary folding by the primary folding roller 32, and then shaped by the folded-edge shaping mechanism 33, so that the primarily folded edge 7 is closely fitted with the original seal edge.

As shown in FIGS. 1-3, the secondary folding mechanism 4 includes a secondary folding roller 41, a hot-press shaping mechanism 42 and a cold-press shaping mechanism 43 which are arranged in turn. The secondary folding roller 41 is arranged near the bonding layer arrangement mechanism 5. When the battery cell passes through the secondary folding mechanism 4, the secondary folding roller 41 vertically bends a side edge of the battery cell, on which a bonding layer 8 has been arranged on the primarily folded edge 7, and makes this side edge closely fitted with the side edge of the battery. The hot-press shaping mechanism 42 heats the primarily folded edge 7, the bonding layer 8 and the side of the battery cell body 6, which are closely fitted with each other. Finally, the cold-press shaping mechanism 43 performs rapid annealing to maximize the viscidity of the bonding layer 8, so that the primarily folded edge 7 and the side of the battery cell body 6 are closely bonded together by the bonding layer 8.

When in use, a battery cell to be processed is placed into the clamp 23, and then positioned and clamped by the centering and positioning push plates 21 and the clamping cylinder 22.

Subsequently, the well positioned battery cell passes through the edge cutter 31, the primary folding roller 32 and the folded-edge shaping mechanism 33 in turn along with the clamp 23. So far, the primary folding is completed.

The primarily folded battery cell enters the first object stage 5131 of the glue dropping mechanism along with the clamp 23. The position monitoring mechanism 511 first monitors the glue dispensing position and then feeds the glue dispensing position back to the glue dropping position control mechanism 512. The glue dropping position control mechanism 512 compares the feedback signal with the preset signal; sends, if there is an offset, an instruction to control the first servo motor 5132, so that the first servo motor 5132 drives the first object state 5131 to a predetermined position; and keeps, if there is no offset, the first object state 5131 unmoved. Meanwhile, the glue volume monitoring mechanism 521 first monitors the glue volume and then feeds the glue volume back to the glue volume control mechanism 522. Then, the glue volume control mechanism 522 compares the feedback signal with a preset signal; sends, if there is an offset, an instruction to the electrically-controlled pressure regulating valve 5231, so as to make the glue inside the glue tank 5232 reach the glue dropper 5233 via the pipeline by adjusting the electrically-controlled pressure regulating valve 5231 and then to make a predetermined amount of glue dropped from the glue dropper 5233; and keeps, if there is no offset, the electrically-controlled pressure regulating valve 5231 not act, so that a free-flowing bonding layer 8 is arranged on the primarily folded edge 7 of the battery cell.

Figure 9:
FIG. 9 is a structural diagram of a finished battery obtained according to the present invention.

The battery cell having the fluid bonding layer 8 arranged thereon passes through the secondary folding roller 41, the hot-press shaping mechanism 42 and the cold-press shaping mechanism 43 in turn to complete a secondary folding. So far, a battery as shown in FIG. 9 is obtained.

Embodiment 2

The difference between this embodiment and Embodiment 1 is that the bonding layer arrangement mechanism 5 is configured as an adhesive tape sticking mechanism, and this mechanism arranges a non-flowing bonding later 8 on the primarily folded edge 7 of the battery cell when the battery cell already subjected to the primary folding passes through this mechanism.

Figure 10:
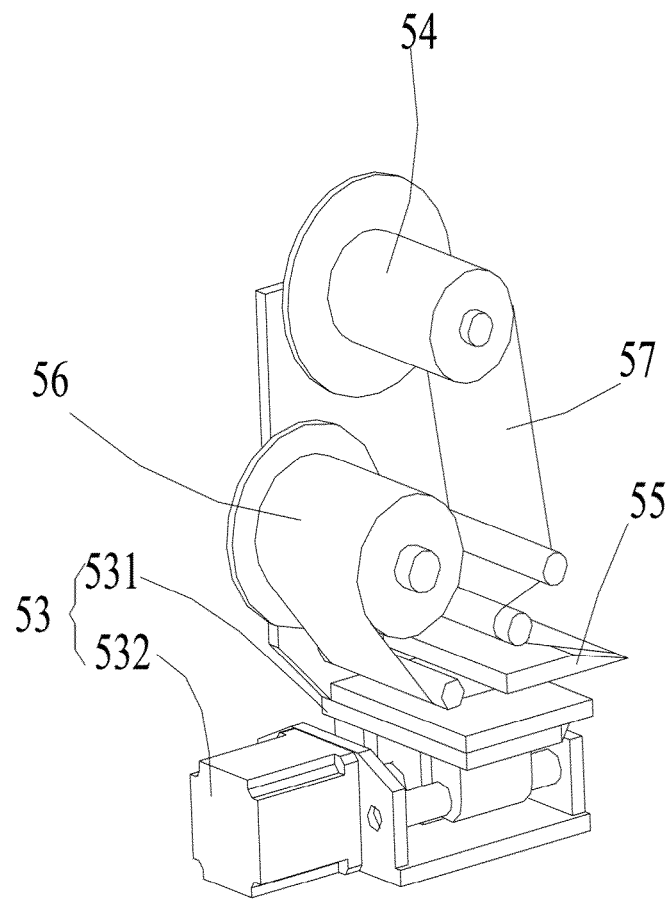
FIG. 10 is schematic diagram of an adhesive tape sticking mechanism according to Embodiment 2 of the present invention (the adhesive tape sticking position monitoring mechanism and the adhesive tape sticking position control mechanism are not shown)

As shown in FIG. 10, the adhesive tape sticking mechanism is a closed-loop control system and includes an adhesive tape sticking position monitoring mechanism, an adhesive tape sticking position control mechanism, an adhesive tape sticking position adjusting mechanism 53, an adhesive tape unrolling device 55 for releasing an adhesive tape 57, an adhesive tape attaching mechanism 55 and an adhesive tape rolling device 56 for winding the adhesive tape 57. The adhesive tape sticking position control mechanism is connected to the adhesive tape sticking position monitoring mechanism and the adhesive tape sticking position adjusting mechanism 53, respectively. One end of the adhesive tape 57 is disposed on the adhesive tape unrolling device 54, while the other end thereof is rolled on the adhesive tape rolling device 56 after passing through the adhesive tape attaching mechanism 55. The adhesive tape 57 disposed on the adhesive tape rolling device 56 is transferred to the primarily folded edge of the battery cell by the adhesive tape unrolling device 55. The adhesive tape sticking position monitoring mechanism monitors an adhesive tape sticking position and then feeds the adhesive tape sticking position back to the adhesive tape sticking position control mechanism. The adhesive tape sticking position control mechanism compares a monitored signal with a preset signal, and then outputs, if the monitored signal does not meet the preset requirements, an instruction to the adhesive tape sticking position adjusting mechanism 53 to adjust the adhesive tape sticking position until the adhesive tape sticking position meets the requirements.

The structures of the adhesive tape sticking position monitoring mechanism and the adhesive tape sticking position control mechanism are the same as those of the position monitoring mechanism 511 and the glue dropping position control mechanism 512 in Embodiment 1.

The adhesive tape sticking position monitoring mechanism is configured as a charge-coupled device image sensor; the adhesive tape sticking position control mechanism is configured as a programmable logic controller, a singlechip or a computer; and the adhesive tape sticking position adjusting mechanism 53 includes a second object stage 531 and a second servo motor 532. The second object stage 531 is driven by the second servo motor 532, and the second servo motor 532 is connected to the adhesive tape sticking position control mechanism.

The battery cell already subjected to the primary folding enters the second object state 531 of the glue dropping mechanism along with the clamp 23. The adhesive tape sticking position monitoring mechanism first monitors the adhesive tape sticking position and then feeds the adhesive tape sticking position back to the adhesive tape sticking position control mechanism. The adhesive tape sticking position control mechanism compares the monitored signal with a preset signal; sends, if there is an offset, an instruction to the second servo motor 532, so that the second servo motor 532 drives the second object state 531 to a predetermined position; keeps, if there is no offset, the second object state 531 unmoved, so that one non-fluid bonding layer 8 is arranged on the primarily folded edge 7 of the battery cell.

T The remaining is the same as Embodiment 1 and will not be repeated here.

T For those skilled in the art, alterations and modifications may be made to the forgoing implementations in accordance with the disclosure and teaching of the specification. Therefore, the present invention is not limited to the foregoing implementations, and any apparent improvements, replacements or variations made by those skilled in the art on the basis of the present invention shall fall into the protection scope of the present invention. In addition, although some particular terms have been used in the specification, these terms are used for purpose of description and not intended to form any limitation to the present invention.

What is claimed is:

1. A double-folding device for softly-packaged lithium ion batteries, comprising a rack, and a loaded-material positioning mechanism, a primary folding mechanism and a secondary folding mechanism which are arranged on the rack in turn, wherein a bonding layer arrangement mechanism is further provided between the primary folding mechanism and the secondary folding mechanism.

2. The double-folding device for softly-packaged lithium ion batteries according to claim 1, wherein the bonding layer arrangement mechanism is configured as a glue dropping mechanism comprising a bonding layer position closed-loop control system and a bonding layer material closed-loop control system.

3. The double-folding device for softly-packaged lithium ion batteries according to claim 2, wherein the bonding layer position closed-loop control system comprises a position monitoring mechanism, a glue dropping position control mechanism and a position adjusting mechanism, the glue dropping position control mechanism being connected to the position monitoring mechanism and the position adjusting mechanism, respectively.

4. The double-folding device for softly-packaged lithium ion batteries according to claim 3, wherein the position monitoring mechanism is configured as a charge-coupled device image sensor; the glue dropping position control mechanism is configured as a programmable logic controller, a singlechip or a computer; and the position adjusting mechanism comprises a first object stage and a first servo motor, the first object stage being driven by the first servo motor, the first servo motor being connected to the glue dropping position control mechanism.

5. The double-folding device for softly-packaged lithium ion batteries according to claim 2, wherein the bonding layer material closed-loop control system comprises a glue volume monitoring mechanism, a glue volume control mechanism and a glue volume adjusting mechanism, the glue volume control mechanism being connected to the glue volume monitoring mechanism and the glue volume adjusting mechanism, respectively.

6. The double-folding device for softly-packaged lithium ion batteries according to claim 5, wherein the glue volume monitoring mechanism is configured as a charge-coupled device image sensor; the glue volume control mechanism is configured as a programmable logic controller, a singlechip or a computer; and the glue volume adjusting mechanism comprises an electrically-controlled pressure regulating valve, a glue tank, a glue dropper and a constant temperature system, the glue tank being in communication with the glue dropper via a pipeline, the constant temperature system being connected to the glue tank, the electrically-controlled pressure regulating valve being connected to the glue tank and the glue volume control mechanism, respectively.

7. The double-folding device for softly-packaged lithium ion batteries according to claim 1, wherein the bonding layer arrangement mechanism is configured as an adhesive tape sticking mechanism comprising an adhesive tape sticking position monitoring mechanism, an adhesive tape sticking position control mechanism, an adhesive tape sticking position adjusting mechanism, an adhesive tape unrolling device for releasing an adhesive tape, an adhesive tape attaching mechanism and an adhesive tape rolling device for winding the adhesive tape, the adhesive tape sticking position control mechanism being connected to the adhesive tape sticking position monitoring mechanism and the adhesive tape sticking position adjusting mechanism, respectively, one end of the adhesive tape being disposed on the adhesive tape unrolling device while the other end thereof being rolled on the adhesive tape rolling device after passing through the adhesive tape attaching mechanism.

8. The double-folding device for softly-packaged lithium ion batteries according to claim 7, wherein the adhesive tape sticking position monitoring mechanism is configured as a charge-coupled device image sensor; the adhesive tape sticking position control mechanism is configured as a programmable logic controller, a singlechip or a computer; and the adhesive tape sticking position adjusting mechanism comprises a second object stage and a second servo motor, the second object stage being driven by the second servo motor, the second servo motor being connected to the adhesive tape sticking position control mechanism.

9. The double-folding device for softly-packaged lithium ion batteries according to claim 1, wherein the loaded-material positioning mechanism comprises centering and positioning push plates, a clamping cylinder and a clamp, the centering and positioning push plates being disposed on left and right sides of the clamp, the clamping cylinder being provided above the clamp.

10. The double-folding device for softly-packaged lithium ion batteries according to claim 1, wherein the primary folding mechanism comprises an edge cutter, a primary folding roller and a folded-edge shaping mechanism which are arranged in turn, the edge cutter being near the loaded-material positioning mechanism, the folded-edge shaping mechanism being arranged near the bonding layer arrangement mechanism; and, the secondary folding mechanism comprises a secondary folding roller, a hot-press shaping mechanism and a cold-press shaping mechanism which are arranged in turn, the secondary folding roller being arranged near the bonding layer arrangement mechanism.

* * * * *